(12) United States Patent
Ueno et al.

(10) Patent No.: US 12,038,146 B2
(45) Date of Patent: Jul. 16, 2024

(54) VEHICULAR LAMP FITTING

(71) Applicant: Stanley Electric Co., Ltd., Tokyo (JP)

(72) Inventors: Taiki Ueno, Tokyo (JP); Shinya Koyama, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/552,122

(22) PCT Filed: Mar. 23, 2022

(86) PCT No.: PCT/JP2022/013750
§ 371 (c)(1),
(2) Date: Sep. 22, 2023

(87) PCT Pub. No.: WO2022/202946
PCT Pub. Date: Sep. 29, 2022

(65) Prior Publication Data
US 2024/0175562 A1    May 30, 2024

(30) Foreign Application Priority Data
Mar. 25, 2021  (JP) ................................. 2021-051032

(51) Int. Cl.
*F21S 41/39*  (2018.01)
*F21S 45/10*  (2018.01)

(52) U.S. Cl.
CPC ............... *F21S 41/39* (2018.01); *F21S 45/10* (2018.01)

(58) Field of Classification Search
CPC .......... F21S 41/39; F21S 41/675; F21S 45/10; B60Q 1/0683
See application file for complete search history.

(56) References Cited

U.S. PATENT DOCUMENTS 6,637,919 B2 * 10/2003 Shirai ..................... F21S 43/50
362/528
6,746,142 B2 * 6/2004 Shirai ................... B60Q 1/0683
362/524
(Continued)

FOREIGN PATENT DOCUMENTS

JP          H06-96601 A       4/1994
JP        2002-193024 A       7/2002
(Continued)

*Primary Examiner* — Thomas M Sember
(74) *Attorney, Agent, or Firm* — KENEALY VAIDYA LLP (57) ABSTRACT

A vehicular lamp fitting capable of suppressing vibration of a reflector (vibration that is occurred during vehicle travel, etc.) is provided. A vehicular lamp fitting comprising a first holding member that holds both a light source and a light control member that controls light emitted by the light source; a second holding member that holds the first holding member so as to be tiltable in the up, down, left and right directions; a vibration suppression unit that suppresses vibration of the first holding member relative to the second holding member; and the vibration suppression unit comprising: a first portion provided on the first holding member; a second portion, which is provided on the second holding member and suppresses the vibration of the first holding member with respect to the second holding member by abutting the first portion vibrating in the vibration direction of the first holding member.

7 Claims, 13 Drawing Sheets

(56) References Cited

U.S. PATENT DOCUMENTS

2002/0085386 A1\* 7/2002 Shirai .................... F21S 43/50
362/284
2003/0117810 A1\* 6/2003 Nakazawa ........... B60Q 1/0683
362/273

FOREIGN PATENT DOCUMENTS

| JP | 2003-272415 A | 9/2003 |
| JP | 2005-056651 A | 3/2005 |

\* cited by examiner

VEHICULAR LAMP FITTING

This application is a U.S. National Stage Application under 35 U.S.C § 371 of International Patent Application No.PCT/JP2022/013750 filed Mar. 23, 2022, which claims the benefit of priority under 35 U.S.C. § 119 to Japanese Patent Application No. 2021-051032 filed Mar. 25, 2021, the disclosures of all of which are hereby incorporated by reference in their entireties.

TECHNICAL FIELD

The present invention relates to a vehicular lamp fitting, and in particular, to a vehicular lamp fitting capable of suppressing vibration of a reflector.

BACKGROUND ART

A vehicular lamp fitting is known in which aiming is performed by connecting a reflector and a housing (lamp body) by a pivot portion (ball joint) and two adjusting screws (aiming screws), rotating each adjusting screw, and tilting the reflector up, down, left, and right with the pivot portion as a fulcrum (See, e.g., Patent Literature 1).

CITATION LIST

Patent Literature

[Patent Literature 1] Japanese Unexamined Patent Application Publication No. 2002-193024

SUMMARY OF INVENTION

Technical Problem

However, in the Patent Document 1, since the reflector is supported at three positions of a pivot portion (ball joint) and two adjusting screws (aiming screws), vibration of the reflector (vibration that is occurred during vehicle travel, etc.) cannot be suppressed, and there is a problem that the rigidity of the resin component involved in aiming of a reflector or the like is reduced.

An object of the present invention is to provide a vehicular lamp fitting capable of suppressing vibration of a reflector (vibration that is occurred during vehicle travel, etc.).

A vehicular lamp fitting according to the present invention comprises a first holding member that holds both a light source and a light control member that controls light emitted by the light source; a second holding member that holds the first holding member so as to be tiltable in the up, down, left and right directions; a vibration suppression unit that suppresses vibration of the first holding member relative to the second holding member; and the vibration suppression unit comprising: a first portion provided on the first holding member; a second portion, which is provided on the second holding member and suppresses the vibration of the first holding member with respect to the second holding member by abutting the first portion vibrating in the vibration direction of the first holding member.

By this configuration, it is possible to suppress vibration of a reflector (vibration that is occurred during vehicle travel, etc.).

This is because the vibration suppression unit that suppresses vibration of the first holding member relative to the second holding member is provided.

In the vehicular lamp fitting described above, a pivot portion provided on the first holding member; a pivot holder provided in the second holding member and rotatably holding the pivot portion; a first adjusting screw that tilts the first holding member in the left-right direction with the pivot portion as a fulcrum; and a second adjusting screw that tilts the first holding member in the up-down direction with the pivot portion as a fulcrum may be provided.

Moreover, in the vehicular lamp fitting described above, the first portion may be provided in the vicinity of the first adjusting screw of the first holding member.

Moreover, in the vehicular lamp fitting described above, the first portion may be provided in the vicinity of the second adjusting screw of the first holding member.

Moreover, in the vehicular lamp fitting described above, the first portion may be a first cylindrical portion extending in a direction intersecting with the vibration direction of the first holding member, the second portion may be a slit portion having a U-shaped cross-sectional shape that extends in a direction intersecting the vibration direction of the first holding member, the first cylindrical portion may be arranged in the slit portion.

Advantageous Effects of Invention

According to the present invention, it is possible to provide a vehicular lamp fitting capable of suppressing vibration of a reflector (vibration that is occurred during vehicle travel, etc.).

DESCRIPTION OF EMBODIMENTS

A vehicular lamp fitting 10 according to an embodiment of the present invention will be described hereinafter with reference to the accompanying drawings. The same components are denoted by the same reference signs throughout the drawings, and redundant descriptions will be omitted.

Figure 1A:
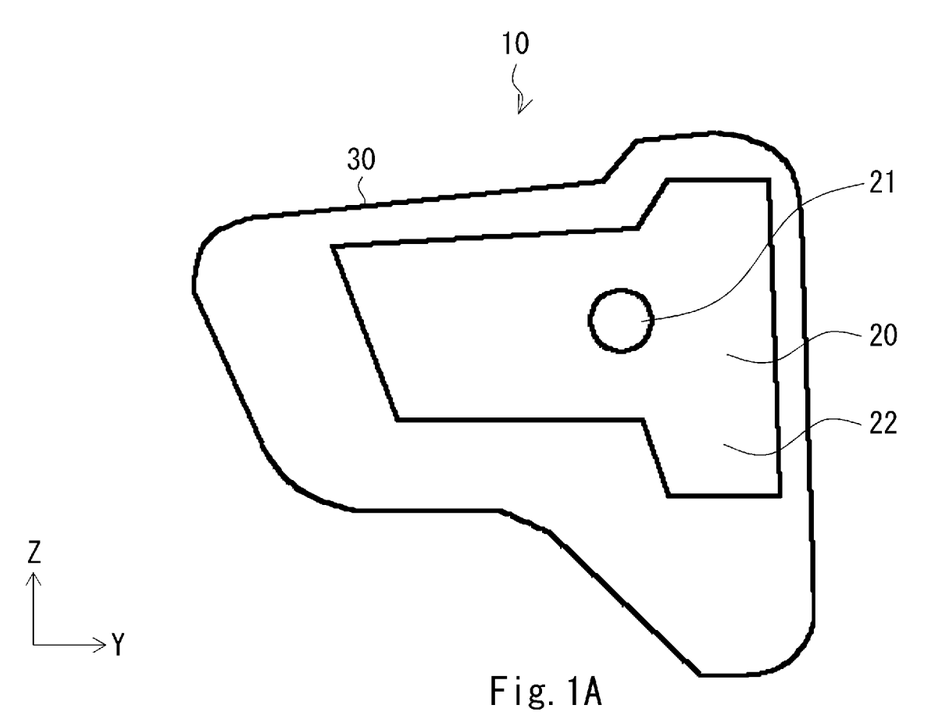
FIG. 1A is a front view of the vehicular lamp fitting 10.
Figure 1B:
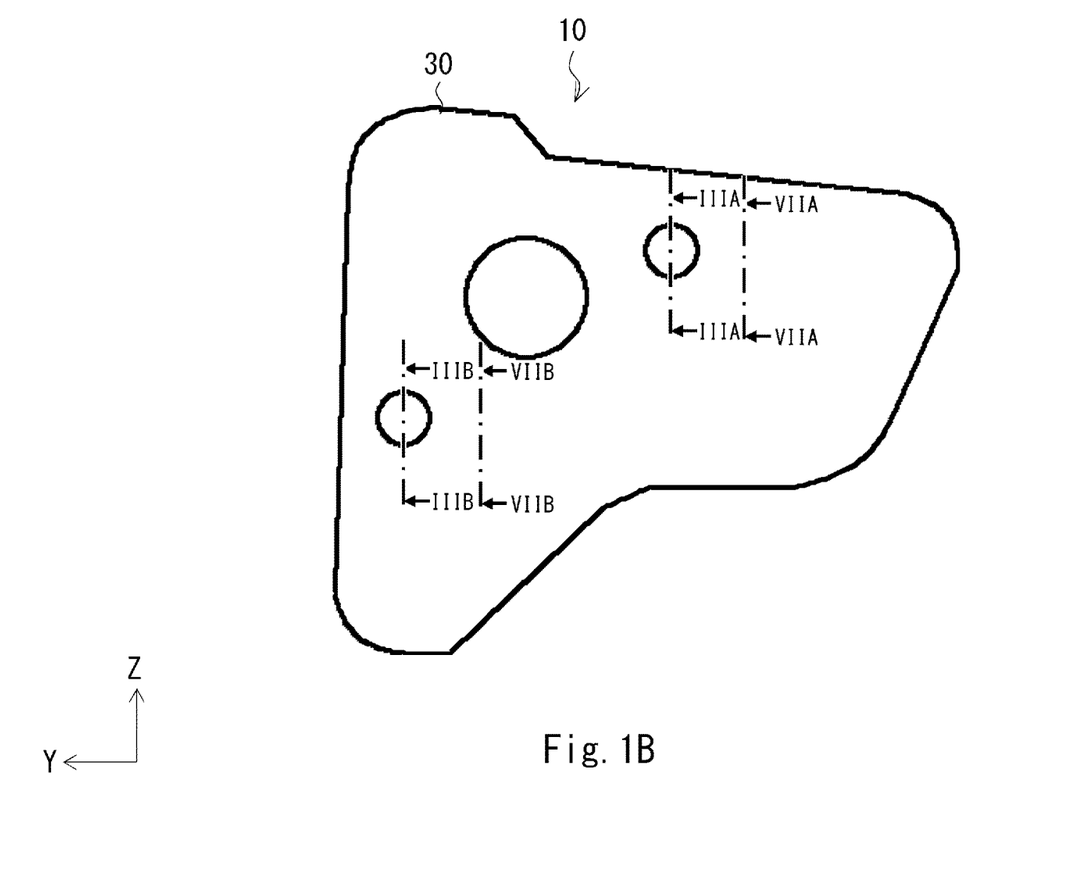
FIG. 1B is a rear view.
Figure 2:
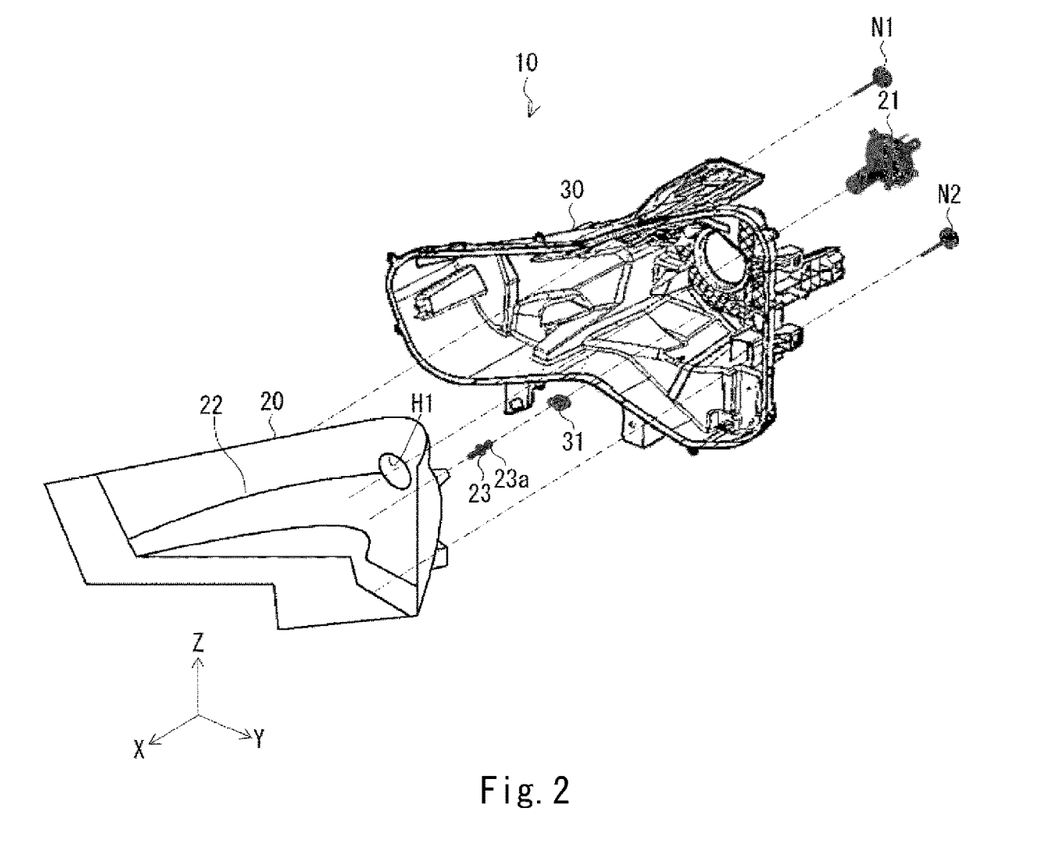
FIG. 2 is an exploded perspective view of the vehicular lamp fitting 10 (an outer lens, etc., omitted)
Figure 3A:
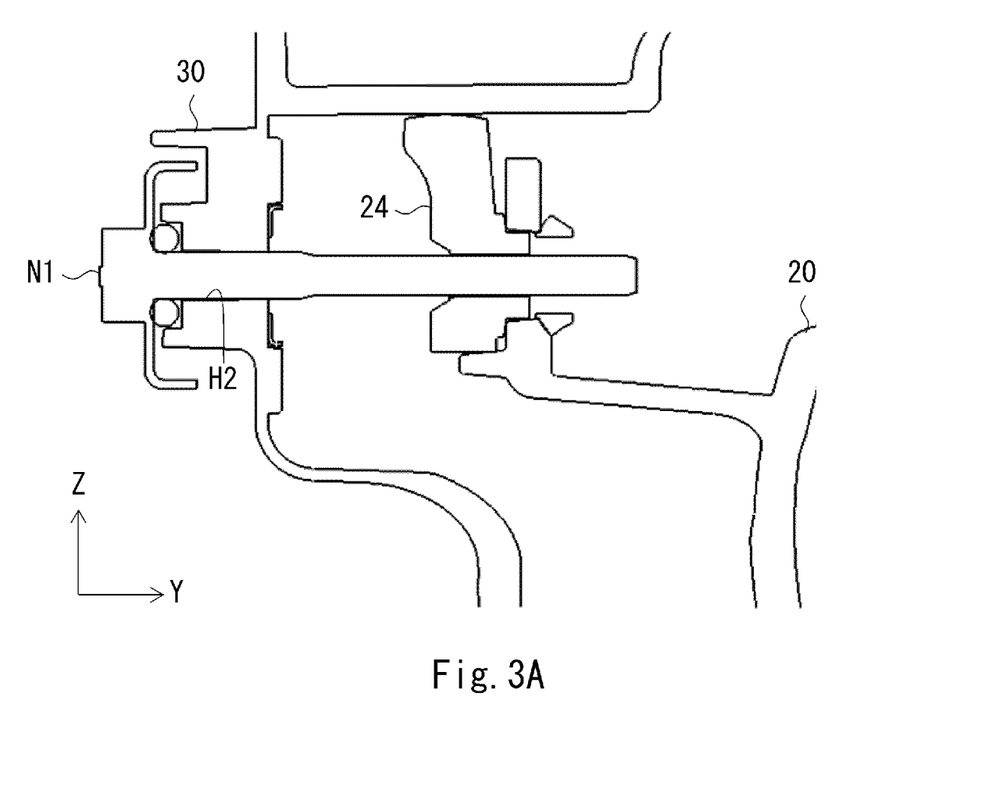
FIG. 3A is a section IIIA-IIIA of FIG. 1B.
Figure 3B:
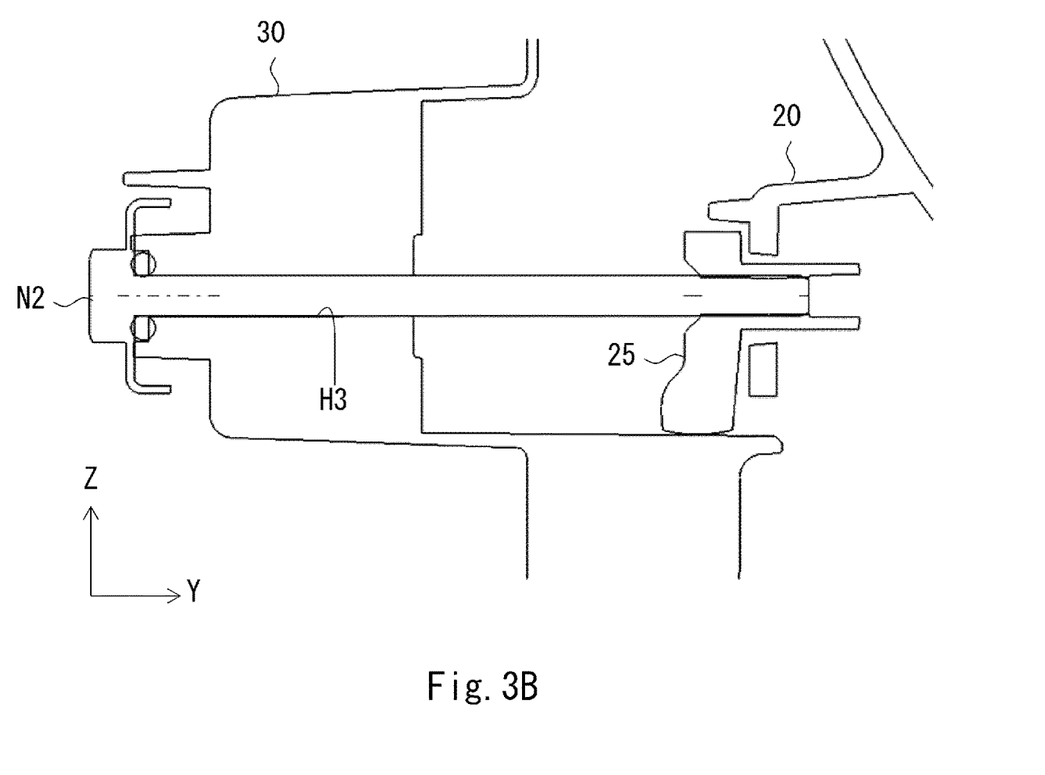
FIG. 3B is a section IIIB-IIIB of FIG. 1B.

FIG. 1A is a front view of the vehicular lamp fitting 10 and FIG. 1B is a rear view. FIG. 2 is an exploded perspective view of the vehicular lamp fitting 10 (an outer lens, etc., omitted). FIG. 3A is a section IIIA-IIIA of FIG. 1B and FIG. 3B is a section IIIB-IIIB of FIG. 1B.

The vehicular lamp fitting 10 of this embodiment is a vehicular head lamp and is mounted on both right and left sides of the front end of a vehicle (not shown) such as an automobile. Since the vehicular lamp fitting 10 mounted on the right and left sides has a symmetrical configuration, the vehicular lamp fitting 10 mounted on the right side (the right side toward the front of the vehicle) of the front end of the vehicle will be described as a representative. For convenience of explanation, the XYZ axes are defined as shown in FIG. 1A etc. The X-axis extends in the longitudinal direction of the vehicle. The Y-axis extends in the vehicle width direction. The Z-axis extends in the vertical direction.

As shown in FIGS. 1A and 2, the vehicular lamp fitting 10 has a reflector 20 and a housing 30.

The reflector 20 holds both a light source 21 and a reflective surface 22 that controls light emitted by the light source 21.

The light source 21 is, for example, a bulb light source such as a halogen bulb H4. Note that the light source 21 may be a bulb light source other than a halogen bulb, for example, a HID lamp. The light source 21 is inserted into the bulb mounting hole H1 (see FIG. 2) that penetrates through the front and back of the reflector 20, and is detachably mounted on the reflector 20, in a positioned state with respect to the reflector 20 (the reflective surface 22), by a known fixing means.

The reflective surface 22 is a reflective surface that controls the light emitted by the light source 21 and is formed on the front side of the reflector 20. Specifically, the reflective surface 22 is composed as a reflective surface (so-called multi-reflector) that combines multiple divided reflective areas so that a low-beam light distribution pattern is formed when the low-beam filament of the light source 21 emits light and a high-beam light distribution pattern is formed when the high-beam filament emits light. The reflective surface 22 is formed, for example, by applying undercoat, aluminum deposition, and top coat to a resin base material (e.g., BMC substrates) in this order.

The reflector 20 is attached to the housing 30 so as to be tiltable (aiming adjustable) in the up, down, left and right directions. Specifically, although not shown, the head 23a (A spherical portion. Hereafter referred to as the pivot portion 23a) of a pivot screw 23 attached to the back of the reflector 20 is rotatably held by a pivot holder 31 attached to the front of the housing 30.

As shown in FIG. 3A, a first adjusting screw N1 inserted into a through hole H2 formed in the housing 30 is screwed to a first aiming nut 24 fixed to the back of the reflector 20. Note that the first adjusting screw N1 is attached to the housing 30 so as to rotate in the same position.

Figure 4:
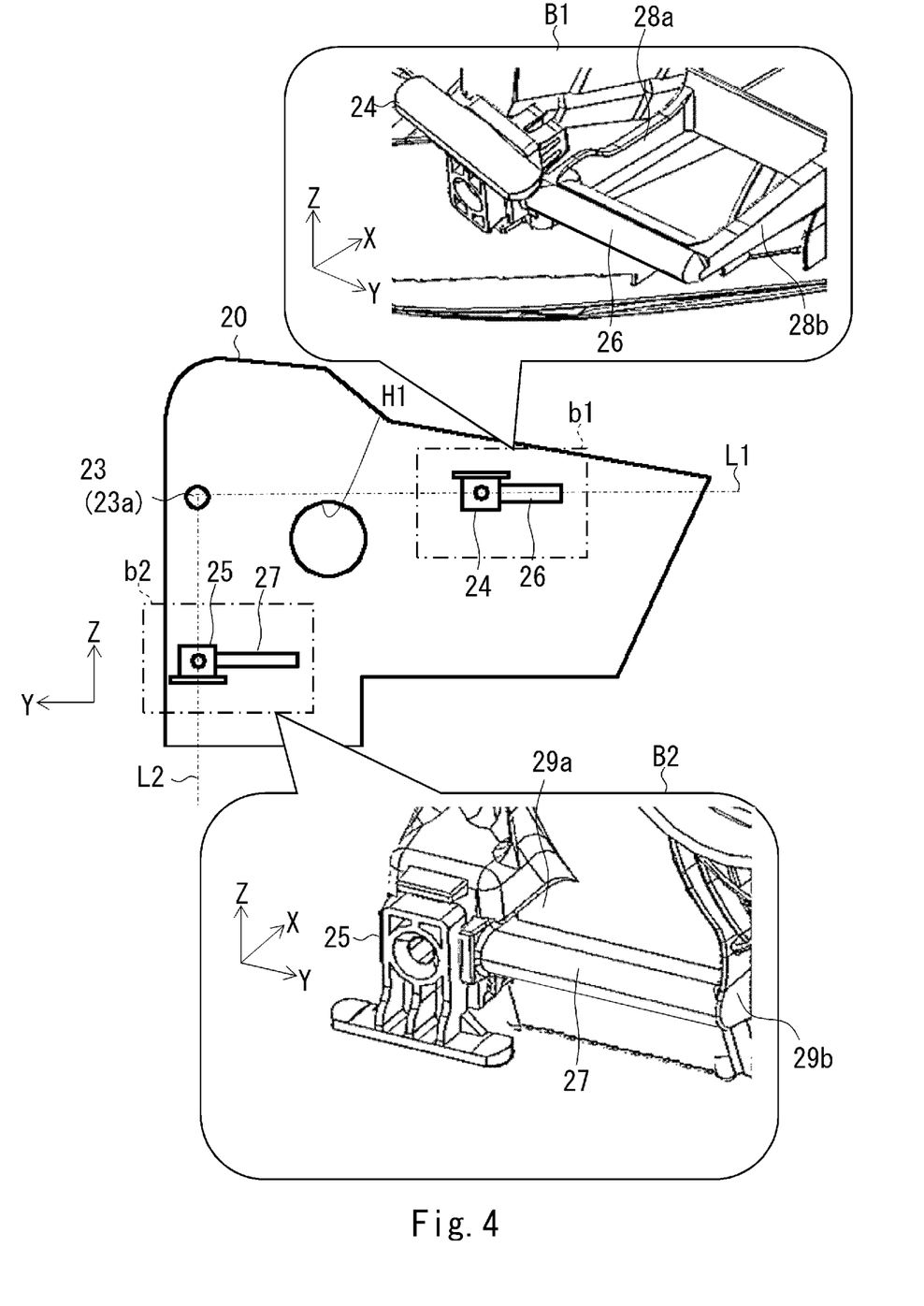
FIG. 4 is a rear view of the reflector 20.

FIG. 4 is a rear view of the reflector 20. The balloon B1 in FIG. 4 is an enlarged perspective view within the rectangle b1 in FIG. 4. The balloon B2 in FIG. 4 is an enlarged perspective view within the rectangle b2 in FIG. 4.

As shown in FIG. 4, the first aiming nut 24 is fixed at a portion of the back surface of the reflector 20 that is a predetermined distance to the right from the pivot screw 23. The straight line L1 passing through the pivot portion 23a and the first aiming nut 24 (the first adjusting screw N1) extends generally in the horizontal direction (Y direction).

As shown in FIG. 3B, a second adjusting screw N2 inserted into a through hole H3 formed in the housing 30 is screwed to a second aiming nut 25 fixed to the back of the reflector 20. Note that the second adjusting screw N2 is attached to the housing 30 so as to rotate in the same position.

Figure 5:
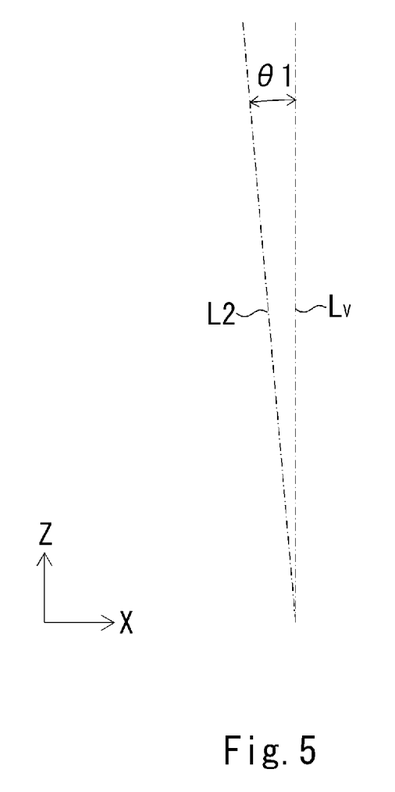
FIG. 5 shows that the straight line L2 passing through the pivot portion 23a and the second aiming nut 25 (the second adjusting screw N2) is inclined backward by an angle θ1 with respect to the vertical line Lv.

As shown in FIG. 4, the second aiming nut 25 is fixed at a portion of the back surface of the reflector 20 that is a predetermined distance downward from the pivot screw 23. Note that the reflector 20 is arranged in an inclined state due to the installation space. Therefore, as shown in FIG. 5, the straight line L2 passing through the pivot portion 23a and the second aiming nut 25 (the second adjusting screw N2) is inclined backward by an angle θ1 with respect to the vertical line Lv. Angle θ1 is, for example, 5 degrees. Note that θ1 may be 0 degrees. FIG. 5 shows that the straight line L2 passing through the pivot portion 23a and the second aiming nut 25 (the second adjusting screw N2) is inclined backward by an angle θ1 with respect to the vertical line Lv.

Next, the aiming operation will be described.

First, the aiming operation in the left-right direction will be described.

Figure 6A:
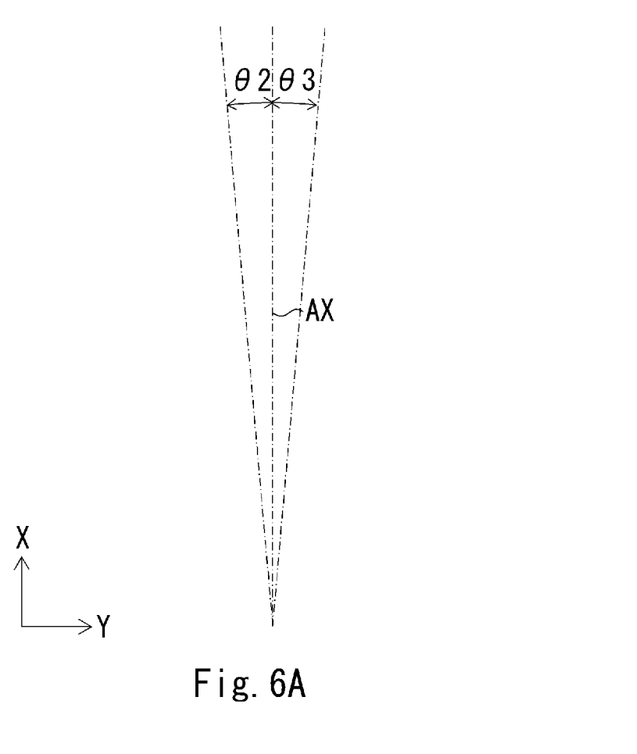
FIG. 6A shows the aiming range (the angles θ2, θ3) in the left-right direction.

FIG. 6A shows the aiming range (the angles θ2, θ3) in the left-right direction.

The aiming in the left-right direction is performed by rotating the first adjusting screw N1 and changing the amount of screwing of the first adjusting screw N1 with respect to the first aiming nut 24.

For example, assume that the first adjusting screw N1 is rotated so that the amount of screwing to the first aiming nut 24 is reduced. In this case, in accordance with the amount of rotation of the first adjusting screw N1 (the amount of screwing with respect to the first aiming nut 24), the reflector 20 is tilted (swung) about the straight line L2 passing through the pivot portion 23a and the second aiming nut 25 (the second adjusting screw N2) with the pivot portion 23a as a fulcrum within an angle θ2 (see FIG. 6A) on the left side (left side toward the front of the vehicle) with respect to a reference axis AX. The reference axis AX extends in the X direction. θ2 is, for example, 2 degrees.

On the other hand, assume that the first adjusting screw N1 is rotated so that the amount of screwing to the first aiming nut 24 is increased. In this case, in accordance with the amount of rotation of the first adjusting screw N1 (the amount of screwing with respect to the first aiming nut 24), the reflector 20 is tilted (swung) about the straight line L2 passing through the pivot portion 23a and the second aiming nut 25 (the second adjusting screw N2) with the pivot portion 23a as a fulcrum within an angle θ3 (see FIG. 6A) on the right side (left side toward the front of the vehicle) with respect to the reference axis AX. θ3 is, for example, 2 degrees.

As described above, by rotating the first adjusting screw N1 and changing the amount of screwing of the first adjusting screw N1 with respect to the first aiming nut 24, the aiming in the left-right direction is performed.

Next, the aiming operation in the up-down direction will be described.

Figure 6B:
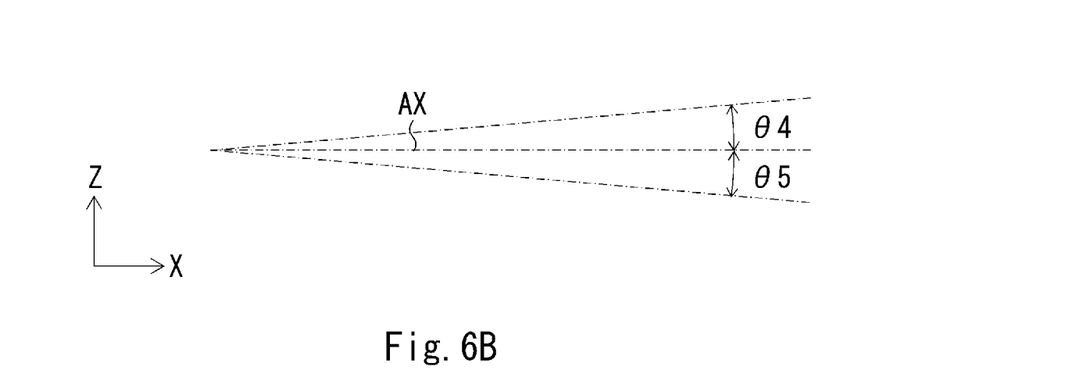
FIG. 6B shows the aiming range (the angles θ4, θ5) in the up-down direction.

FIG. 6B shows the aiming range (the angles θ4, θ5) in the up-down direction.

The aiming in the up-down direction is performed by rotating the second adjusting screw N2 and changing the amount of screwing with respect to the second aiming nut 25.

For example, assume that the second adjusting screw N2 is rotated so that the amount of screwing to the second aiming nut 25 is reduced. In this case, in accordance with the amount of rotation of the second adjusting screw N2 (the amount of screwing with respect to the second aiming nut 25), the reflector 20 is tilted (swung) about the straight line L1 passing through the pivot portion 23a and the first aiming nut 24 (the first adjusting screw N1) with the pivot portion 23a as a fulcrum within an angle θ4 (see FIG. 6B) on the upper side with respect to the reference axis AX. θ4 is, for example, 2 degrees.

On the other hand, assume that the second adjusting screw N2 is rotated so that the amount of screwing to the second aiming nut 25 is increased. In this case, in accordance with the amount of rotation of the second adjusting screw N2 (the amount of screwing with respect to the second aiming nut 25), the reflector 20 is tilted (swung) about the straight line L1 passing through the pivot portion 23a and the first aiming nut 24 (the first adjusting screw N1) with the pivot portion 23a as a fulcrum within an angle θ5 (see FIG. 6B) on the lower side with respect to the reference axis AX. θ5 is, for example, 2 degrees.

As described above, by rotating the second adjusting screw N2 and changing the amount of screwing of the second adjusting screw N2 with respect to the second aiming nut 25, the aiming in the up-down direction is performed.

Next, a configuration (a configuration of the vibration suppression unit) to suppress the vibration (up-down vibration in FIG. 3) of the reflector 20 will be described. A first cylindrical portion 26, a second cylindrical portion 27, a first slit portion 32, and a second slit portion 33 constitute the vibration suppression unit (a slider mechanism).

As shown in FIG. 4, the first cylindrical portion 26 and the second cylindrical portion 27 are provided on the back of the reflector 20.

The first cylindrical portion 26 is provided on the straight line L1 passing through the pivot portion 23a and the first aiming nut 24 (the first adjusting screw N1) and in the vicinity of the first adjusting screw N1. The first cylindrical portion 26 extends in a direction (For example, in the Y direction) that intersects (For example, orthogonal) with the vibration direction (up-down direction) of the reflector 20. The first cylindrical portion 26 is supported by support portions 28a, 28b whose both ends portion in its axial direction extend from the back surface of the reflector 20 (see balloon B1 in FIG. 4). Note that the first cylindrical portion 26, the support portions 28a, 28b, and the reflector 20 are integrally formed. Note that the first cylindrical portion 26 may have a complete or incomplete cylindrical shape. In the present embodiment, for the convenience of the mold (in relation to the draft angle), the first cylindrical portion 26 is not a perfect cylindrical shape but an incomplete cylindrical shape.

Figure 7A:
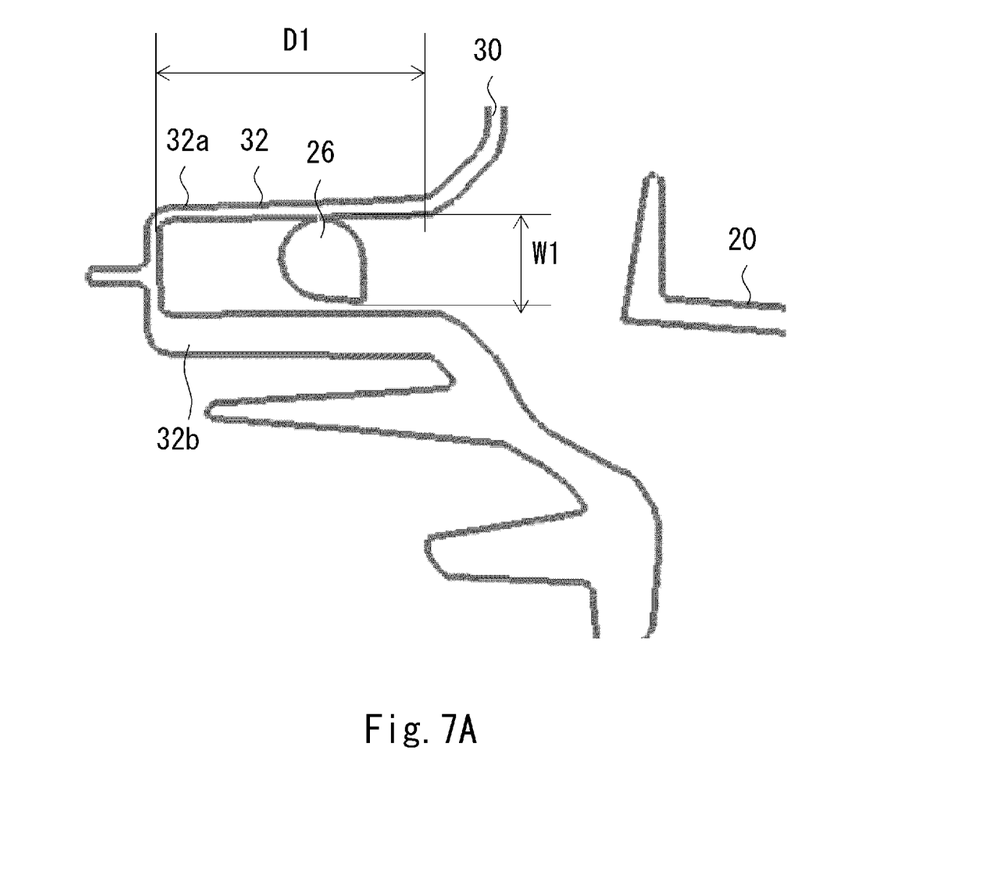
FIG. 7A is a VIIA-VIIA section view of FIG. 1B.

FIG. 7A is a VIIA-VIIA section view of FIG. 1B.

With the reflector 20 attached to the housing 30 so as to tilt up, down, left and right directions, the first cylindrical portion 26 is arranged in the first slit portion 32 provided in the housing 30, as shown in FIG. 7A.

The first slit portion 32 includes an upper portion 32a and a lower portion 32b extending in a direction (For example, in the Y direction) intersecting (For example, orthogonal) with respect to the vibration direction (up and down direction) of the reflector 20, and is a portion having a U-shaped cross section.

The slit width W1 (the distance between the upper portion 32a and the lower portion 32b. See FIG. 7A) of the first slit portion 32 is a value considered so that it is smaller than the amount of movement (the amount of movement in the Z direction) of the first cylindrical portion 26 due to the vibration (up-down direction vibration) of the reflector 20.

In addition, the slit depth D1 of the first slit portion 32 (see FIG. 7A) is a value considered so that the first cylindrical portion 26 moves within the first slit portion 32 (That is, so that the first cylindrical portion 26 does not move out of the first slit portion 32.), even if the reflector 20 is inclined around the straight line L2 passing through the pivot portion 23a and the second aiming nut 25 (the second adjusting screw N2) with the pivot portion 23a as a fulcrum by the left-right direction aiming.

As shown in FIG. 4, the second cylindrical portion 27 is provided in the vicinity of the second adjusting screw N2. The second cylindrical portion 27, like the first cylindrical portion 26, extends in a direction (For example, in the Y direction) that intersects (For example, orthogonal) with the vibration direction (up-down direction) of the reflector 20. The second cylindrical portion 27 is supported by support portions 29a, 29b whose both ends portion in its axial direction extend from the back surface of the reflector 20 (see balloon B2 in FIG. 4). Note that the second cylindrical portion 27, the support portions 29a, 29b, and the reflector 20 are integrally formed. Note that the second cylindrical portion 27 may have a complete or incomplete cylindrical shape. In the present embodiment, for the convenience of the mold (in relation to the draft angle), the second cylindrical portion 27 is not a perfect cylindrical shape but an incomplete cylindrical shape.

Figure 7B:
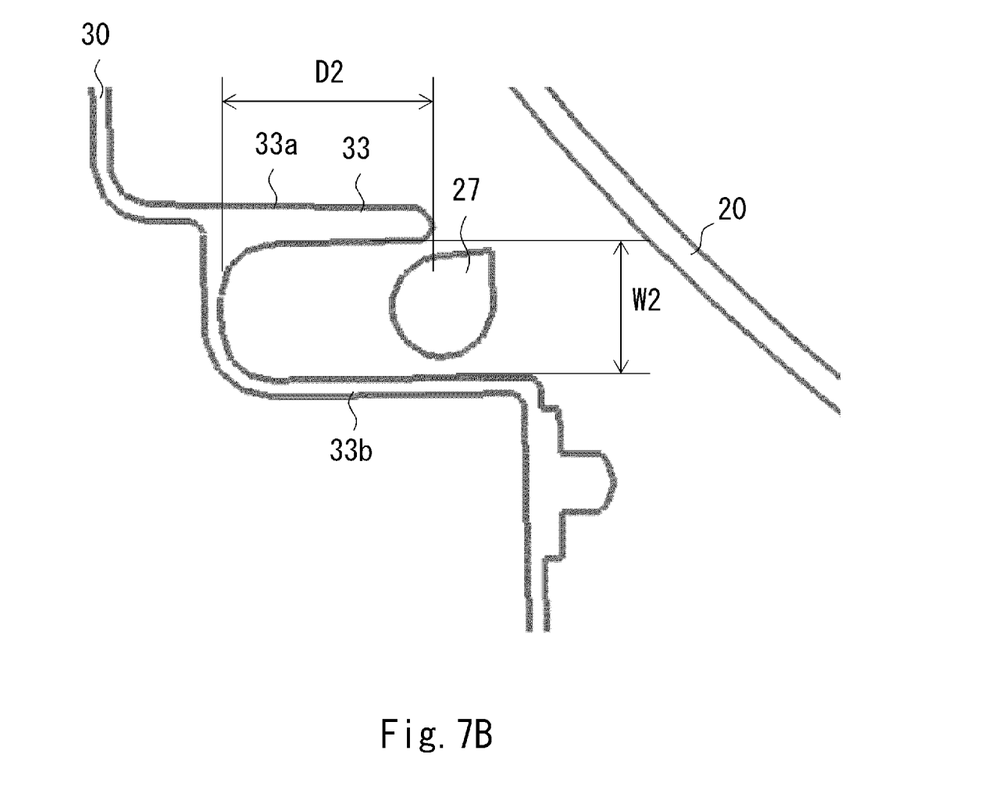
FIG. 7B is a VIIB-VIIB section view of FIG. 1B.

FIG. 7B is a VIIB-VIIB section view of FIG. 1B.

With the reflector 20 attached to the housing 30 so as to tilt up, down, left and right directions, the second cylindrical portion 27 is arranged in the second slit portion 33 provided in the housing 30, as shown in FIG. 7B.

The second slit portion 33 includes an upper portion 33a and a lower portion 33b extending in a direction (For example, in the Y direction) intersecting (For example, orthogonal) with respect to the vibration direction (up and down direction) of the reflector 20, and is a portion having a U-shaped cross section.

The slit width W2 (the distance between the upper portion 33a and the lower portion 33b. See FIG. 7B) of the second slit portion 33 is a value considered so that it is smaller than the amount of movement (the amount of movement in the Z direction) of the second cylindrical portion 27 due to the vibration (up-down direction vibration) of the reflector 20.

In addition, the slit depth D2 of the second slit portion 33 (see FIG. 7B) is a value considered so that the second cylindrical portion 27 moves within the second slit portion 33 (That is, so that the second cylindrical portion 27 does not move out of the second slit portion 33.), even if the reflector 20 is inclined around the straight line L1 passing through the pivot portion 23a and the first aiming nut 24 (the first adjusting screw N1) with the pivot portion 23a as a fulcrum by up-down direction aiming. However, in this embodiment, the upper portion 33a of the second slit portion 33 is shorter than the lower portion 33b for the convenience of the mold (in relation to the draft angle). Note that the upper portion 33a of the second slit portion 33 may be shorter than the lower portion 33b because the vibration of the second cylindrical portion 27 side (vibration in up-down direction) of the reflector 20 is smaller than that of the first cylindrical portion 26 side (vibration in up-down direction) and the second cylindrical portion 27 and the second slit portion 33 are supplementary vibration measures.

Next, vibration suppression operation will be described.

Figure 8:
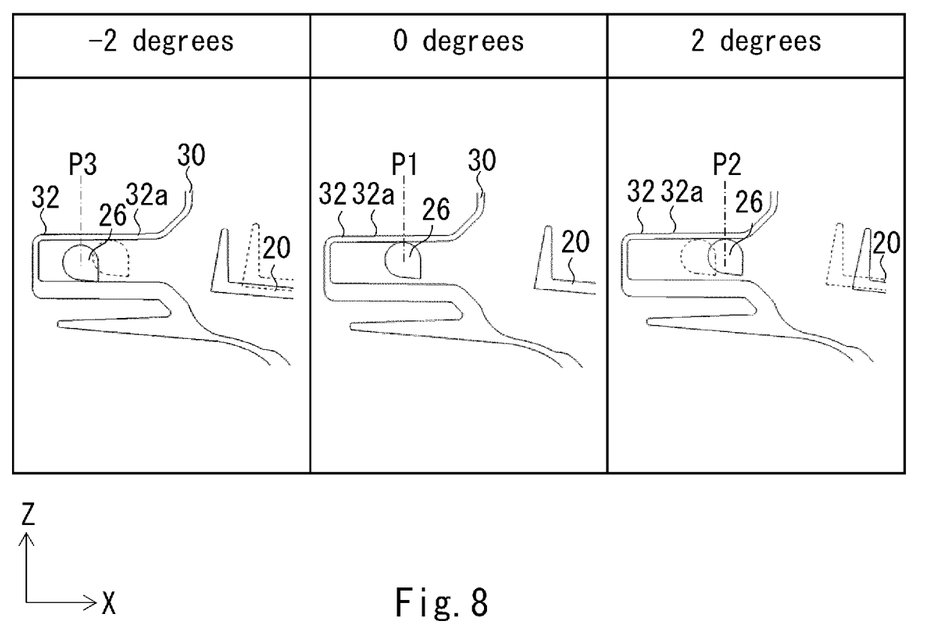
FIG. 8 is a diagram for explaining the vibration suppression operation.
Figure 9:
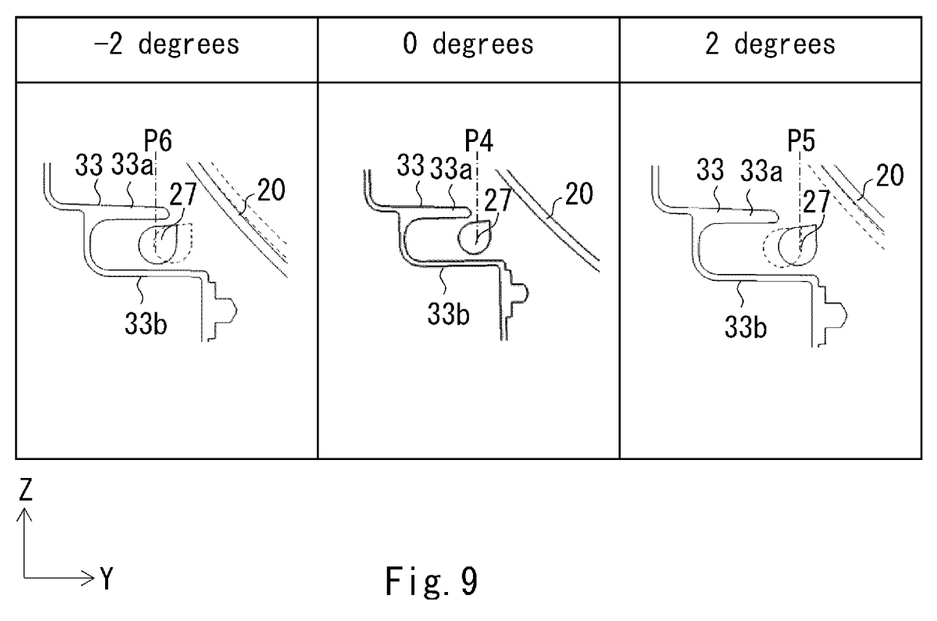
FIG. 9 is a diagram for explaining the vibration suppression operation.

FIGS. 8 and 9 are diagrams for explaining the vibration suppression operation.

In FIG. 8, "0 degree" indicates the positional relationship between the first cylindrical portion 26 and the first slit portion 32 provided in the housing 30 in the reference state before aiming. In FIG. 8, "2 degree" indicates the positional relationship between the first cylindrical portion 26 and the first slit portion 32 provided in the housing 30 in the state in which the reflector 20 is tilted (swung) at an angle θ2 (see FIG. 6A) to the left side (left side toward the front of the vehicle) with respect to the reference axis AX around the straight line L2 passing through the pivot portion 23a and the second aiming nut 25 (the second adjusting screw N2) with the pivot portion 23a as a fulcrum. In FIG. 8, "−2 degree" indicates the positional relationship between the first cylindrical portion 26 and the first slit portion 32 provided in the housing 30 in the state in which the reflector 20 is tilted (swung) at an angle θ3 (see FIG. 6A) to the right side (right side toward the front of the vehicle) with respect to the reference axis AX around the straight line L2 passing through the pivot portion 23a and the second aiming nut 25 (the second adjusting screw N2) with the pivot portion 23a as a fulcrum.

Referring to FIG. 8, it can be seen that when aiming is performed in the left-right direction within the angles θ2 and θ3, the first cylindrical portion 26 moves within the first slit portion 32 (That is, the first cylindrical portion 26 does not move outside the first slit portion 32.). That is, when aiming is performed in the left-right direction within the angles θ2 and θ3, the first cylindrical portion 26 moves in a state sandwiched between the upper portion 32a and the lower portion 32b of the first slit portion 32.

Thus, when the reflector 20 (the first cylindrical portion 26) vibrates (vibrates in the up-down direction), the vibrating first cylindrical portion 26 abuts on the first slit portion 32 (the upper 32a or the lower 32b). This suppresses the vibrations (vibrations in the up-down direction) of the reflector 20 (the first cylindrical portion 26).

In FIG. 9, "0 degree" indicates the positional relationship between the second cylindrical portion 27 and the second slit portion 33 provided in the housing 30 in the reference state before aiming. In FIG. 9, "2 degree" indicates the positional relationship between the second cylindrical portion 27 and the second slit portion 33 provided in the housing 30 in the state in which the reflector 20 is tilted (swung) at an angle θ4 (see FIG. 6B) upward with respect to the reference axis AX around the straight line L1 passing through the pivot portion 23a and the first aiming nut 24 (the first adjusting screw N1) with the pivot portion 23a as a fulcrum. In FIG. 9, "−2 degree" indicates the positional relationship between the second cylindrical portion 27 and the second slit portion 33 provided in the housing 30 in the state in which the reflector 20 is tilted (swung) at an angle θ5 (see FIG. 6B) downward with respect to the reference axis AX around the straight line L1 passing through the pivot portion 23a and the first aiming nut 24 (the first adjusting screw N1) with the pivot portion 23a as a fulcrum.

Referring to FIG. 9, it can be seen that when aiming is performed in the up-down direction within the angles θ4 and θ5, the second cylindrical portion 27 moves within the second slit portion 33 (That is, the second cylindrical portion 27 does not move outside the second slit portion 33.). That is, when aiming is performed in the left-right direction within the angles θ4 and θ5, the second cylindrical portion 27 moves in a state sandwiched between the upper portion 33a and the lower portion 33b of the second slit portion 33.

Thus, when the reflector 20 (the second cylindrical portion 27) vibrates (vibrates in the up-down direction), the vibrating second cylindrical portion 27 abuts on the second slit portion 33 (the upper 33a or the lower 33b). This suppresses the vibrations (vibrations in the up-down direction) of the reflector 20 (the second cylindrical portion 27).

As described above, according to the present embodiment, the vibration of the reflector 20 (Vibration in the up-down direction that occurs when the vehicle is running, etc.) can be suppressed. As a result, the rigidity of the resin component involved in aiming of a reflector or the like is improved.

This is due to the fact that the vibration suppression unit (a slider mechanism) that suppresses vibration (vibration in the up-down direction) of the reflector 20 with respect to the housing 30, namely the first cylindrical portion 26, the second cylindrical portion 27, the first slit portion 32, and the second slit portion 33, is provided, the first cylindrical portion 26 is arranged within the first slit portion 32, and the second cylindrical portion 27 is arranged within the second slit portion 33. Although there is no apparent movement (almost no movement) during vibration in the up-down, distortion occurs in the first aiming nut 24 and the second aiming nut 25. In contrast, according to the present embodiment, the first aiming nut 24, the second aiming nut 25, and the like do not move more than necessary due to the vibration suppression unit (a slider mechanism), so that distortion is minimized. As a result, the damage to the first aiming nut 24 and the second aiming nut 25 is suppressed.

Next, a variation is described.

In the above embodiment, an example using the reflector 20 that holds both the light source 21 (a bulb light source) and the reflective surface 22 that controls the light emitted by the light source 21 as the first holding member was described, but this is not limited to the above.

For example, as the first holding member, a mounting ring 40 (also called a bracket) that holds both a light source (a semiconductor light emitting element such as an LED), an optical system (Low beam unit and high beam unit) such as a lens that controls the light emitted by the light source may be used.

Figure 10:
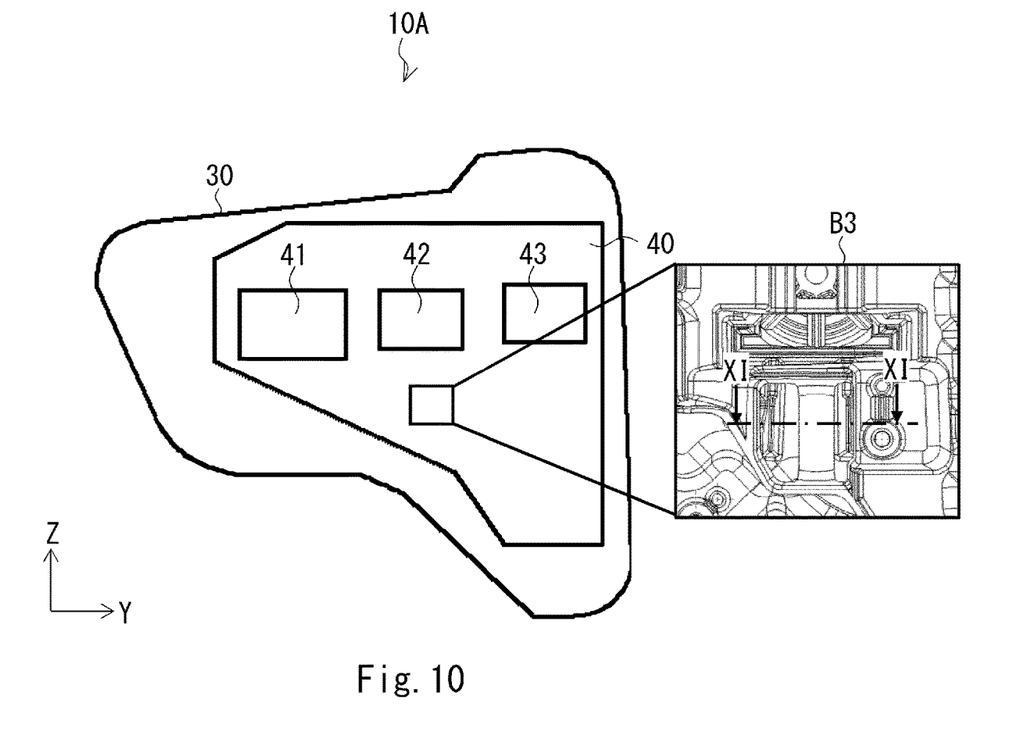
FIG. 10 is an example of a vehicular lamp fitting 10A using the mounting ring 40 that holds three lenses 41, 42, and 43 that controls light emitted by a light source.

FIG. 10 is an example of a vehicular lamp fitting 10A using the mounting ring 40 that holds three lenses 41, 42, and 43 that controls light emitted by a light source.

In addition, in the above embodiment, when the vibration (vibration in the up-down direction) of the reflector 20 is suppressed, an example in which the first cylindrical portion 26 (and the second cylindrical portion 27) extending in a direction (for example, the Y direction) that intersects (for example, orthogonally) with respect to the vibration direction and the first slit portion 32 (and the second slit portion 33) extending in a direction (for example, the Y direction) that intersects (for example, orthogonally) with respect to the vibration direction, and having a U-shaped cross section are used as the vibration suppression unit (a slider mechanism) has been described, but this is not limited to the above.

Figure 11:
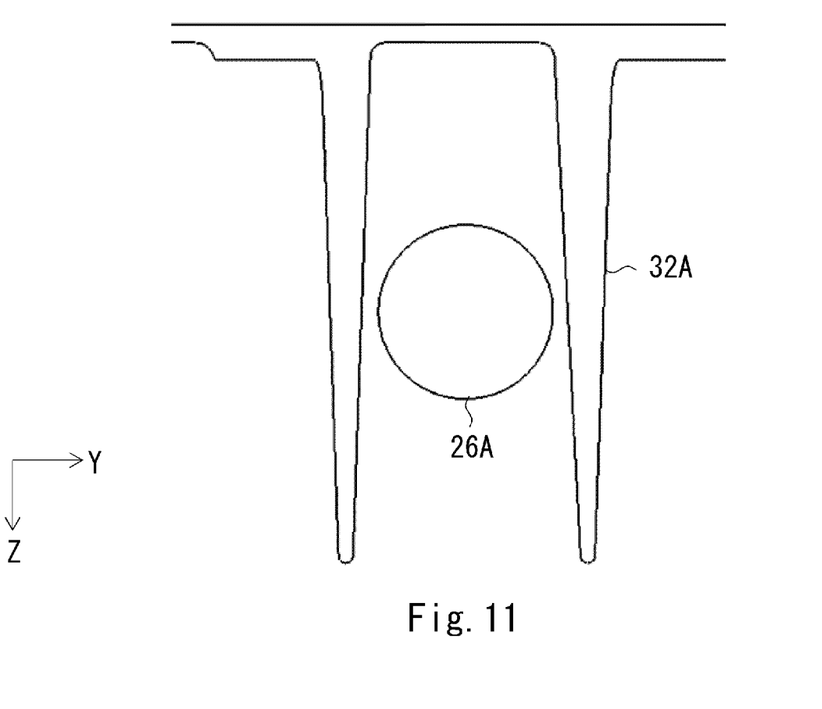
FIG. 11 is a cross section of XI-XI within the rectangle B3 in FIG. 10.

For example, when the vibration (vibration in the left-right direction) of the reflector 20 is suppressed, a cylindrical portion extending in a direction (for example, the Z direction) that intersects (for example, orthogonally) with respect to the vibration direction and a slit portion extending in a direction (for example, the Z direction) that intersects (for example, orthogonally) with respect to the vibration direction, and having a U-shaped cross section may be used as the vibration suppression unit (a slider mechanism)(see FIG. 11). FIG. 11 is a cross section of XI-XI within the rectangle B3 in FIG. 10, and is an example using a cylindrical portion 26A extending in a direction (for example, the Z direction) that intersects (for example, orthogonally) with respect to the vibration (vibration in the left-right direction) direction of the reflector 20 and a slit portion 32A extending in a direction (for example, the Z direction) that intersects (for example, orthogonally) with respect to the vibration direction, and having a U-shaped cross section. FIG. 11 is a cross section of C—C within the rectangle B3 in FIG. 10.

In the above embodiment, the example in which the first cylindrical portion 26 (and the second cylindrical portion 27) are integrally formed with the reflector 20 was described, but this is not limited to the above. For example, the first cylindrical portion 26 (and the second cylindrical portion 27) may be configured as a separate component from the reflector 20 and attached to the reflector 20 afterward.

The vehicular lamp fitting of the present invention may also be applied to an LED headlamp (Projector type, reflector type, direct projection type).

The numerical values shown in the above-described each embodiment is all given by way of example, and it is obvious that appropriate different numerical values can be used instead.

The above-described each embodiment is, in every respect, merely an example. The present invention should not be limited by the description of the above-described each embodiment. The present invention can be implemented in other various ways without departing from its spirit or major characteristics.

This application is based upon and claims the benefit of priority from Japanese patent application No. 2021-051032, filed on Mar. 25, 2021, the disclosure of which is incorporated herein in its entirety by reference.

REFERENCE SIGNS LIST 10, 10A VEHICULAR LAMP FITTING
20 REFLECTOR
21 LIGHT SOURCE
22 REFLECTIVE SURFACES
23 PIVOT SCREW
23a HEAD (PIVOT PORTION)
24 FIRST AIMING NUT
25 SECOND AIMING NUT
26 FIRST CYLINDRICAL PORTION
26A CYLINDRICAL PORTION
27 SECOND CYLINDRICAL PORTION
28a, 28b SUPPORT PORTION
29a, 29b SUPPORT PORTION
30 HOUSING
31 PIVOT HOLDER
32 FIRST SLIT PORTION
32A SLIT PORTION
32a UPPER PORTION
32b LOWER PORTION
33 SECOND SLIT PORTION
33a UPPER PORTION
33b LOWER PORTION
40 MOUNTING RING
41-43 LENS
AX REFERENCE AXIS
B1, B2 BALLOON
D1, D2 SLIT DEPTH
111 BULB MOUNTING HOLE
H2, H3 THROUGH HOLE
N1 FIRST ADJUSTING SCREW
N2 SECOND ADJUSTING SCREW
W1, W2 SLIT WIDTH

The invention claimed is:

1. A vehicular lamp fitting comprising:
a first holding member that holds both a light source and a light control member that controls light emitted by the light source;
a housing that holds the first holding member so as to be tiltable in up, down, left and right directions; and
a vibration suppression unit that is a slider mechanism that suppresses vibration of the first holding member relative to the housing; wherein
the vibration suppression unit comprising:
a first cylindrical portion provided on a back surface of the first holding member and extending in a direction intersecting with the up-down vibration direction of the first holding member; and
a slit portion, which is provided in the housing and suppresses the up-down vibration of the first holding member with respect to the housing by abutting the first cylindrical portion vibrating in the up-down vibration direction of the first holding member; wherein
the slit portion extends in a direction intersecting the up-down vibration direction of the first holding member and has a U-shaped cross-sectional shape, and
the first cylindrical portion is supported by two support portions whose both end portions in the axial direction of the first cylindrical portion extend from the back surface of the first holding member and arranged in the slit portion.

2. The vehicular lamp fitting according to claim 1 further comprising:
a pivot portion provided on the first holding member;
a pivot holder provided in the housing and rotatably holding the pivot portion;
a first adjusting screw that tilts the first holding member in the left-right direction with the pivot portion as a fulcrum; and
a second adjusting screw that tilts the first holding member in the up-down direction with the pivot portion as a fulcrum.

3. The vehicular lamp fitting according to claim 1, wherein the first cylindrical portion is provided in a vicinity of the first adjusting screw of the first holding member.

4. The vehicular lamp fitting according to claim 2, wherein
a second cylindrical portion is provided in a vicinity of the second adjusting screw of the first holding member.

5. The vehicular lamp fitting according to claim 1, wherein
the first holding member, the two support portions, and the first cylindrical portion are integrally formed.

6. The vehicular lamp fitting according to claim 1, wherein
the first holding member is a mounting ring that holds a plurality of light control members.

7. The vehicular lamp fitting according to claim 6 further comprising:
another vibration suppression unit that is a slider mechanism that suppresses vibration in the left-right direction of the mounting ring with respect to the housing; wherein
said another vibration suppression unit comprising:
another cylindrical portion provided on the mounting ring and extending in a direction intersecting with the left-right vibration direction; and
another slit portion that is provided in the housing, extends in a direction intersecting with the left-right vibration direction of the mounting ring and has a U-shaped cross-sectional shape; wherein
said another cylindrical portion is arranged in said another slit portion.

* * * * *